April 26, 1932. D. T. BROWNLEE 1,855,936
ANTIREVERSE SAFETY CLUTCH
Filed Feb. 14, 1930 2 Sheets-Sheet 1

INVENTOR:
Dalmar T. Brownlee,
BY E. D. Silvius.
ATTORNEY.

April 26, 1932.  D. T. BROWNLEE  1,855,936
ANTIREVERSE SAFETY CLUTCH
Filed Feb. 14, 1930  2 Sheets-Sheet 2
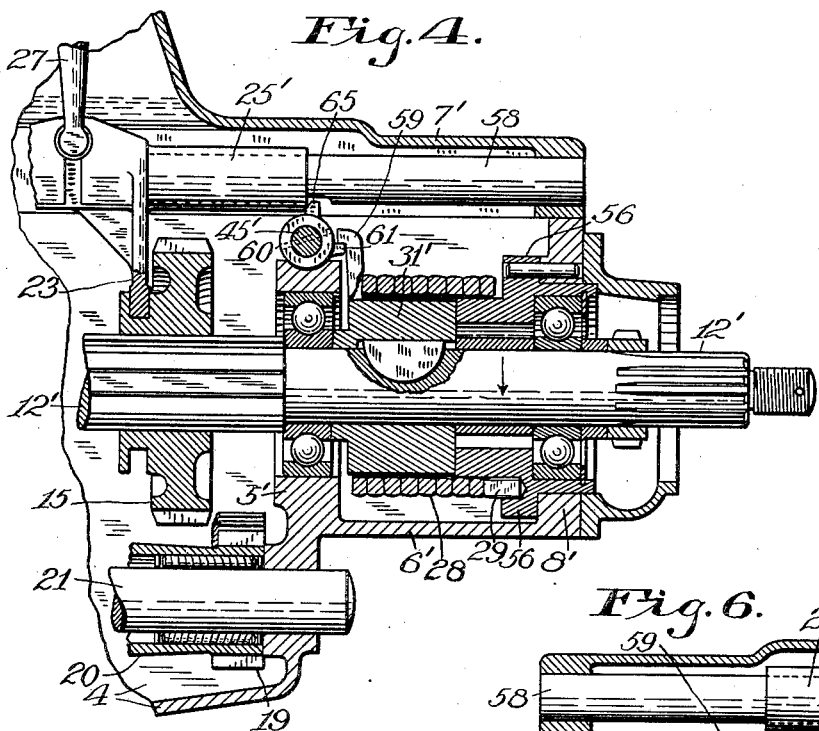
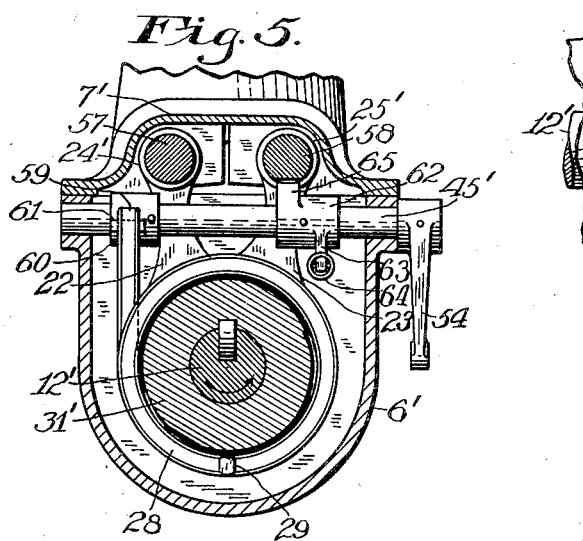
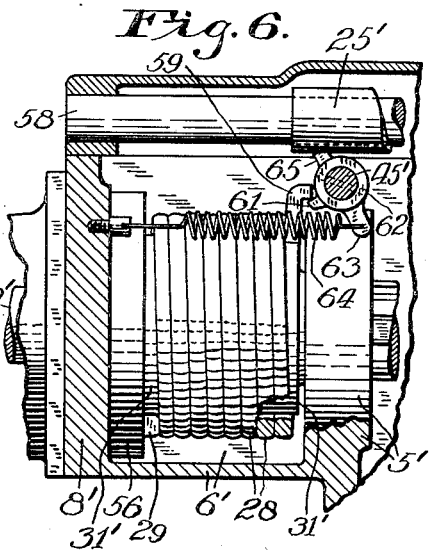
Dalmar T. Brownlee,
INVENTOR.
BY E. T. Silvius
ATTORNEY

Patented Apr. 26, 1932

1,855,936

UNITED STATES PATENT OFFICE

DALMAR T. BROWNLEE, OF INDIANAPOLIS, INDIANA, ASSIGNOR TO L. G. S. DEVICES CORPORATION, OF INDIANAPOLIS, INDIANA, A CORPORATION OF INDIANA

ANTIREVERSE SAFETY CLUTCH

Application filed February 14, 1930. Serial No. 428,412.

This invention relates to the subject of automatic prevention of reverse movement of a rotary shaft normally turning in one direction, such as the transmission shaft of a motor-vehicle, the invention having reference more particularly to means designed automatically to act and prevent reverse or backward movement of a motor-vehicle and controllable to permit reverse or backward movement when so desired.

An object of the invention is to provide an improved anti-reverse mechanism that shall be of simple and yet efficient construction so as to reliably act and prevent backward motion of a motor-vehicle and not require expert attendance.

Another object is to provide an improved anti-reverse safety clutch mechanism that shall be adapted to be manufactured at low cost and not be of such nature as to be troublesome and costly for maintenance and repairs.

A further object is to provide an improved anti-reverse safety clutch mechanism, and particularly a controlling mechanism therefor that shall be of such construction as to be adapted to be controlled by means of speed changing and reversing mechanism, and especially a shifter rod thereof of the type adapted for use in connection with motor-vehicle controlling mechanism.

A still further object is to provide an improved anti-reverse safety clutch controlling mechanism that shall be of such construction as to be adapted to be associated with conventional transmission apparatus of motor-vehicles, and to operate smoothly and silently and not be liable to stick fast or lock against ready release when required.

With the above-mentioned and other objects in view, the invention consists in novel clutching mechanism adapted for automatic action, and improved controlling apparatus therefor, and in combination with a transmission shaft and its housing, and with speed changing gearing and controlling apparatus therefor; the invention consisting further in the parts and combinations and arrangements of parts as hereinafter particularly described and further defined in the appended claims.

Figure 1:
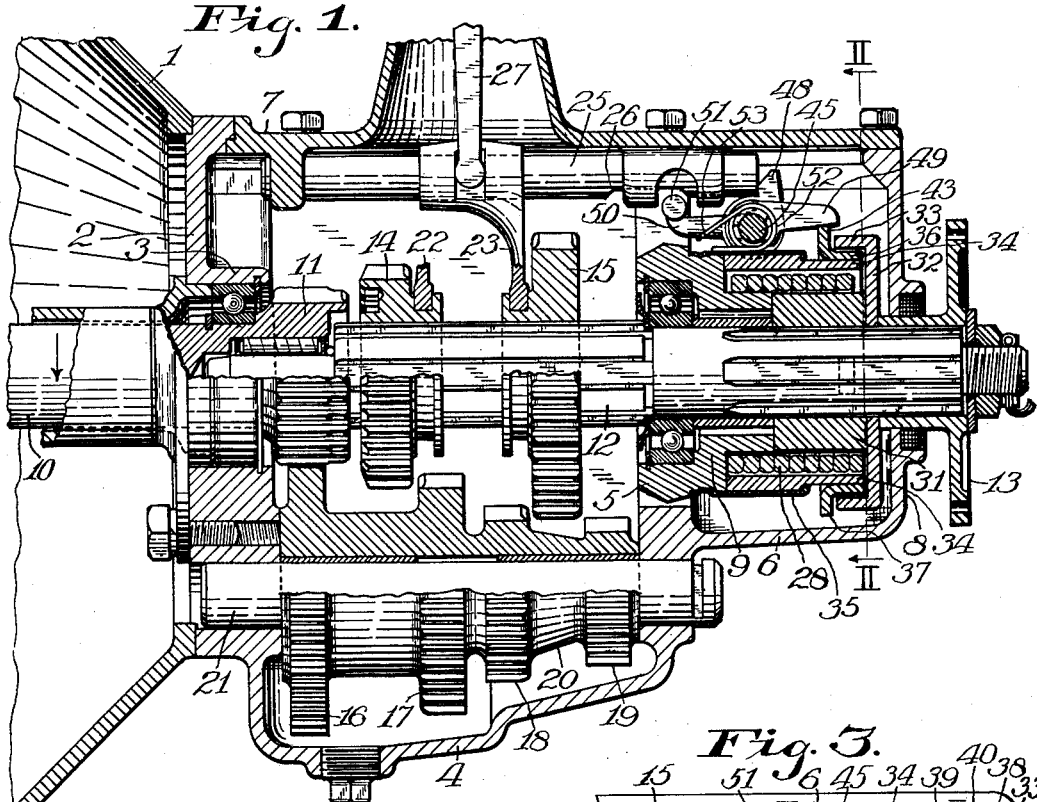
Figure 2:
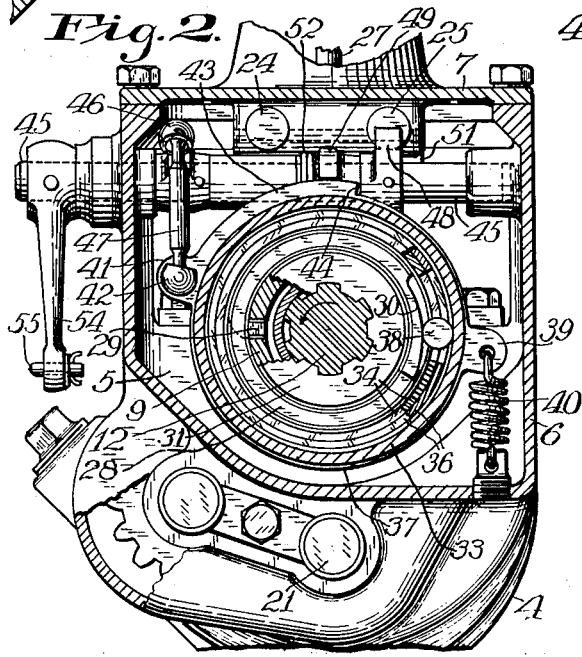
Figure 3:
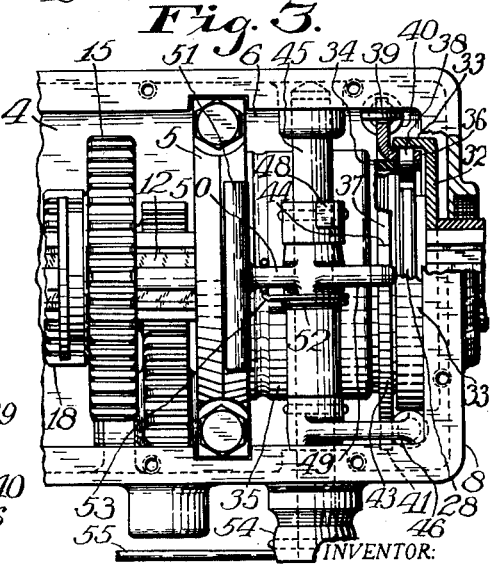

Referring to the accompanying drawings,—Figure 1 is a longitudinal vertical central section of the improved anti-reverse mechanism in connection with a transmission gear set of common type fragmentarily illustrated; Fig. 2 is a transverse section approximately on the line II—II in Fig. 1; Fig. 3 is a fragmentary top plan of the improved apparatus; Fig. 4 is a fragmentary vertical central section of a modified form of anti-reverse clutching apparatus; Fig. 5 is a fragmentary transverse section of Fig. 4; and Fig. 6 is a fragmentary central section viewed from the opposite side of Fig. 4.

Similar reference characters in the different figures of the drawings indicate corresponding elements or features of construction herein referred to in detail.

The invention being well adapted for use in motor-vehicles is illustrated and described in connection with conventional speed changing transmission gearing of the type commonly applied thereto, the necessary engine being omitted, it being understood that the engine has a crank case 1 provided with a back or rear end 2 having a bearing box 3, a transmission gear box or housing 4 being fixed to the back end 2 and provided in its rear end with a bearing box 5; and for the purposes of the present invention the housing 4 has an extension 6 on its back end, and also a lid 7 on the top of the housing and the extension, the latter being provided with a back end wall 8. The bearing box 5 is rigid with the housing and supports an annular collar 9 adapted to constitute a frame member. The engine crank shaft 10 is suitably supported rotatably in the bearing box 3 and has a combined gear wheel and clutch member 11 thereon. In said member, one end of a transmission shaft 12 is journaled and a mid portion of said shaft is journaled in the bearing box 5 while its rear end extends through the end wall 8, said rear end of the shaft being provided with a coupling member 13 whereby to drive a propeller shaft. The transmission shaft has a shifter gear 14 thereon that is adapted to be moved into clutching engagement with the combination gear 11 for high speed forward drive, a larger gear 15 being shiftable also on the shaft. The gear set includes also a number of gears 16, 17, 18 and 19 fixed to a hollow spindle 20 suitably supported by a countershaft 21 fixed in the housing, the arrangement of the gears being conventional and well understood. The gear 14 is controlled by a suitable shifter fork 22, the gear 15 being controlled by a shifter fork 23, the forks being guided on shifter rods 24 and 25 respectively that are supported for longitudinal movement on the under side of the lid 7 and having recesses or notches 26 in their lower portions, the shifter forks being operated selectively by means of a suitable shifter lever 27.

In a practical embodiment of the invention a clutch spring 28 is provided which has one end portion firmly secured to the housing member 9 in a suitable annular recess therein and is provided on its inner end with an anchorage lug 29 that extends into a suitable pocket in said member. The peripheral portion of said spring, adjacent to its opposite end, has an inclined recess 30 therein so pitched as to form a wedge member, the larger end of the member corresponding to the end of the clutch spring. A hollow cylindrical clutch member 31 is secured on the transmission shaft within the spring 28 to be engaged thereby. A web hub 32 is secured to the transmission shaft against the outer end of the member 31 and held in place by the hub of the flange 13, and the web has a guide or track flange 33 thereon that projects partially over the clutch spring 28 at a suitable distance therefrom. A controlled collar or ring 34 is arranged rotatively in connection with the housing member 9 and is retained thereon by means of an annular guide collar 35 or in any suitable manner. The ring 34 has a laminating band 36 thereon which has a flange 37 on its edge so as to be arranged adjacent to the track flange 33. A roller 38 is arranged on the inner side of the track to operate on the inclined portion 30 of the spring before mentioned, the roller being disposed in suitable slots in the ring 34 and the band 36. The flange 37 has an ear 39 on one portion thereof to which is connected a spring 40, the spring being anchored to a lower portion of the housing. The opposite portion of the flange has a projection 41 thereon that carries a bearing member 42. The upper portion of the flange is extended to constitute a latch bar guide rib 43 having a latch shoulder 44 on one end thereof.

Apparatus for controlling the safety clutch includes a control shaft 45 rotatively supported horizontally by the housing extension 6 so as to extend transversely above the retaining collar 35 and it has a control arm 46 fixed thereto, a connecting rod 47 being suitably connected with the arm and also with the bearing member 42 whereby to slightly turn the ring 34. The shaft 45 has a finger 48 fixed thereto that extends upward so as to be engaged by the shifter rod 25 as the latter is moved backward in the operation of shifting the gear 15. A latch bar 49 and a control arm 50 are fixed to a hub that is loosely supported on the shaft 45, the arm 50 having a cross-bar 51 that extends under the shifter rods so as to operate in the recesses 26. The bar 49 extends back over the guide portion 43 and is held down thereto by means of a coil spring 52 arranged on the hub of the bar and having one arm 53 that is hooked under the arm 50, the spring being suitably anchored against turning on the hub. For manually turning the shaft 45 a lever arm 54 is secured thereto and connected to a suitable rod 55 which may lead to any desired point, such as an instrument board, to be manually actuated when desirable to purposely unclutch the shaft if stopped by the safety clutch against reverse movement.

The modified structure illustrated in Figs. 4, 5 and 6 is such as to be controlled by means of the shifter rods and the lever arm above referred to and comprises the housing parts previously pointed out in which is a bearing box 5' at the junction of the extension 6' with the main portion of the housing, there being a lid 7' on the housing. The housing extension has a rear end wall 8'. A transmission shaft 12' is rotatively supported in the bearing box 5' and also in the wall 8'. An annular housing member 56 is secured to the wall 8' and the lug 29 of the clutch spring 28 is anchored thereto. The shifter rods 24' and 25' are hollow and guided on bars 57 and 58 respectively that are supported by the lid 7'. The opposite end of said spring has a suitable lug device 59 thereon whereby to draw the device into contact with a clutch member 31' that is secured to the shaft 12'. A control shaft 45' is arranged transversely and supported rotatively by the opposite side portions of the housing. A collar 60 is secured to the control shaft and has a finger 61 thereon to control the lug device. Also a collar 62 is secured to the control shaft and has a short arm 63 thereon extending downward to which a coil spring 64 is connected which is suitably anchored to the end wall 8' of the housing, the collar 62 having also a finger 65 thereon that is adapted to be engaged by the end of the shifter rod 25' whereby to release the safety clutch automatically when the shifter rod is moved backward while shifting the gear 15. The control shaft 45' may be slightly turned by means of the arm 54 to release the safety clutch.

In practical use, when a mechanism such as shown in Figs. 1, 2 and 3 is embodied in a motor-vehicle, the drive or transmission shaft rotates in the direction indicated by the arrows Fig. 2 for forward movement of the motor-vehicle. The gear 14 is shifted forward for high speed forward and backward for second speed or may be stopped in the neutral position. The gear 15 may be held in neutral position or may be moved forward for low speed or backward for reverse movement, in the usual manner. At high speed forward the clutch spring 28 is held so that its control portion is in contact with the clutch member on the drive shaft but not with sufficient force to cause appreciable friction, the metal of said spring and clutch member being of suitable composition to resist wear that might be due to slipping contact. If the motor-vehicle stops when ascending a hill, in case it starts to move backward because of failure of brakes to hold it, the reverse movement of the drive shaft tends to wind up the clutch spring 28 and reduce its diameter so as to tightly grip upon the clutch member on the shaft, resulting in immediate stopping of the shaft. Similarly the backward movement is stopped in case the motor-vehicle is to be manually pushed on the ground when parking, or in a garage but is unclutched by manipulation of the lever arm 54. When the motor-vehicle is stopped, to prevent the clutching against backward movement when it is desired to run backward under power, the shifting of the gear 15 back to reverse position is accompanied by such movement of the shifter rod as to cause release of the safety clutch device, as will be understood. In the structure having the latch bar 49, said bar moves into engagement with the shoulder 44 following the turning of the collar 34 to latch the apparatus upon release of the clutching apparatus from operation. The various actions of the parts of mechanism incidental to the shifting of gears will readily be understood by reference to the foregoing detail description and common knowledge of motor-vehicle transmission and speed changing gearing, without further explanation in detail.

In the case of the structure shown in Figs. 4, 5 and 6, when the transmission is in a forward speed, the spring 64 normally acts through the arm 63 to turn the collar 62 and shaft 45' in a direction wherein the finger 61 which is also fixed to said shaft, so engages the lug device 59 as to hold said spring with a slight frictional drag on the clutch member 31. When the vehicle starts an undesired descent upon a grade, the reverse movement of the shaft 12' tends to wind up the clutch spring and reduce its diameter so that it tightly and frictionally grips upon the member 31' and stops such movement of the shaft. A similar action will take place when the vehicle is being pushed rearwardly on a level road or like surface.

To render the structure inoperative to permit such backward movement when necessary, outside of the driving of the vehicle in reverse, the arm 54 may be actuated to rock the shaft 45' against the action of the spring 64 so that the finger 61 moves away from the lug device 49. This allows the clutch spring 28 to expand slightly so that the drag of the same on the clutch member 31 is released. Thereafter the vehicle may be pushed rearwardly because it has now been rendered inoperative.

When the shifter rod 25' is moved rearwardly, to provide reverse for the vehicle, said rod will act against the finger 65 as shown in Fig. 6 to rock the shaft 45' so that the finger 61 will move away from the device 57 of the clutch spring, which now expands to that extent to release the drag between said clutch spring 28 and associated clutch member 31'. With the clutch parts thus released, the vehicle may be driven in reverse gear. When shifting out of reverse, the shift rod 28' moves away from the finger 65 and the spring 64 will return the parts to their normal position, ready for operation for their intended purposes.

What is claimed is:

1. Anti-reverse mechanism having a rotary clutch member, a clutch spring anchored at one end and arranged concentric with the clutch member, spring impelled adjusting means surrounding and operating in connection with the opposite end of the clutch spring to change the diameter of said device so as to grip the clutch member, a horizontally arranged rock shaft and means connecting said shaft and spring impelled adjusting means for turning the latter to actuate said clutch spring.

2. Anti-reverse mechanism having a housing, a transmission shaft and a shifter rod mounted in the housing, a clutch member secured to the shaft, a clutch spring to co-operate with the clutch member anchored at one end to the housing, a control shaft supported by the housing between the transmission shaft and the shifter rod, and controlled means controllably co-operating with the opposite end of the clutch spring and the control shaft for control of the clutch spring by the shifter rod.

3. Anti-reverse mechanism having a housing provided with a horizontal rockable control shaft, a transmission shaft and a shifter rod mounted in the housing, spring-impelled clutching apparatus co-operating with the housing and automatically operating on the transmission shaft to stop reverse motion thereof, and means controlled by the shifter rod and actuating the control shaft to release the clutching apparatus from action, the apparatus having connection with the control shaft to be released thereby.

4. Anti-reverse mechanism including a housing, a transmission shaft rotatable in the housing, a clutch member secured to the shaft, a clutch spring extending about the clutch member and having one end anchored to the housing and an opposite end provided with controlling means normally acting to draw the clutch spring to the member, and a rotative control shaft to co-operate with the controlling means for releasing the clutch spring from the clutch member, the control shaft being provided with a control projection to be automatically engaged and also with a manual control lever arm.

5. In anti-reverse mechanism, the combination of a rotary drive shaft and a housing therefor, a clutch spring on the drive shaft anchored at one end to the housing, an impelling spring anchored to the housing, connecting apparatus co-operating with the impelling spring and the opposite end of the clutch spring to draw the same into operative position for stopping the shaft upon reverse rotary movement thereof, and latching apparatus operating under control to restrain the impelling spring and release the clutch spring from operation.

6. In anti-reverse mechanism, the combination of a housing and a rotary transmission shaft and also a clutch spring to stop the shaft upon reverse rotary movement thereof, controlling apparatus to co-operate with the housing and the clutch spring to enable automatic operation thereof or to restrain the operation thereof, said apparatus comprising the combination of a rotary latch ring, a rotative control shaft having connection with the ring, a pawl to operate on the ring, and means to actuate the control shaft.

7. In anti-reverse mechanism, the combination of a housing, a transmission shaft rotatably supported in the housing and having a cylindrical clutch member and also a web fixed thereto, the web having an annular track flange integral therewith that extends about the clutch member at a distance therefrom, an annular support fixed in the housing, a clutch spring anchored at one end to said support and extending about the clutch member, the opposite end of said clutch spring having a clamp wedge, a roller to co-operate with said track and said wedge, and a controlled collar on said support and controlling the roller.

8. In anti-reverse mechanism, the combination of a housing having a bearing box fixed therein, the box being provided with an annular rearward projection, a transmission shaft rotatably supported in the bearing box and extending loosely through said projection, a cylindrical clutch member secured to the transmission shaft adjacent to the end of said projection, a clutch spring anchored at one end to said projection and extending about said clutch member, the opposite end of the clutch spring being provided with control means to draw and hold the same to said clutch member, and releasing means for restraining the control means.

9. In anti-reverse mechanism, the combination of a housing, a transmission shaft rotatably supported in the housing and provided with a clutch member, a controllable clutch spring for co-operation with the housing and the clutch member to stop the shaft upon reverse rotation of the shaft, means including a collar rotatively supported by the housing for controlling the clutch spring, the collar having an ear on one side and a bearing member on the opposite side thereof, a spring anchored to the housing and connected to said ear to turn the collar operatively in one direction, a controlled control shaft rotatively supported by the housing and having an arm thereon, a rod connected with said arm and said bearing member to turn the collar in the opposite direction to release the clutch spring, a latch bar to hold the collar when turned by action of the control shaft, a lever arm secured to the control shaft, and a controlling rod connected to the lever arm.

10. In anti-reverse mechanism control apparatus, the combination of a rotary safety clutch control collar having a peripheral rib and a shoulder at the end of the rib, a rotary control shaft having a finger and also an arm fixed thereto, a rod connected with the arm and also with the control collar to turn the collar in release direction, a spring connected with the collar to turn the collar in the opposite direction, a hub loose on the control shaft and having a latch bar to rest on said rib and engage said shoulder following movement of the collar in release direction, said hub being provided with an arm having a cross-bar on its end, a spring mounted on said hub and having an arm arranged to push said latch bar down to said rib and said cross-bar upward for co-operation with a shifter rod, and a manual lever arm secured to the control shaft.

11. In anti-reverse mechanism control apparatus, the combination of a rotary drive shaft, a cylindrical clutch member secured to the shaft, a clutch spring extending about said member and anchored at one and having a wedge device on its opposite end, an annular track having a supporting web secured to the drive shaft, a collar extending about the clutch spring and having a slot in its wall, a roller operating in said slot in co-operation with said track and said wedge device, means to support the collar rotatively, a spring to hold the collar operatively, and means for shifting the collar to release said roller from operation with said wedge device.

12. In anti-reverse mechanism control apparatus, the combination of a housing member, a rotary cylindrical clutch member adjacent to the housing member, a clutch spring anchored at one end to the housing member to co-operate with the clutch member, a coiled tension spring anchored at one end, and operative control means having connection with the opposite end of the coiled tension spring and operating for controlling the opposite end of the clutch spring relatively to the clutch member.

In testimony whereof I affix my signature on the 24th day of January, 1930.

DALMAR T. BROWNLEE.